J. T. ATHERTON.
ELEVATING TRUCK.
APPLICATION FILED MAR. 6, 1911.
1,196,638.
Patented Aug. 29, 1916.
2 SHEETS—SHEET 1.
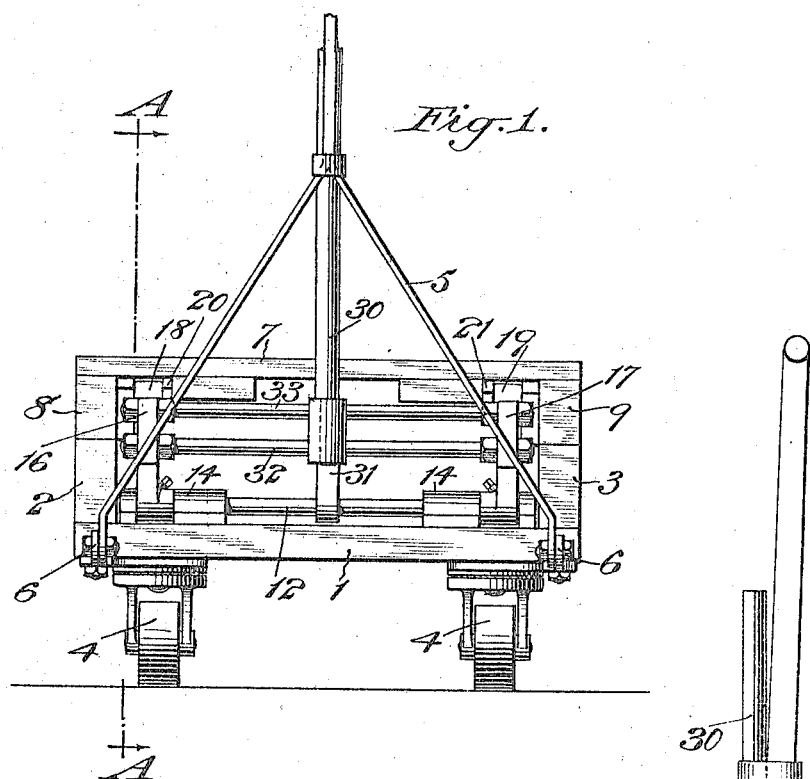
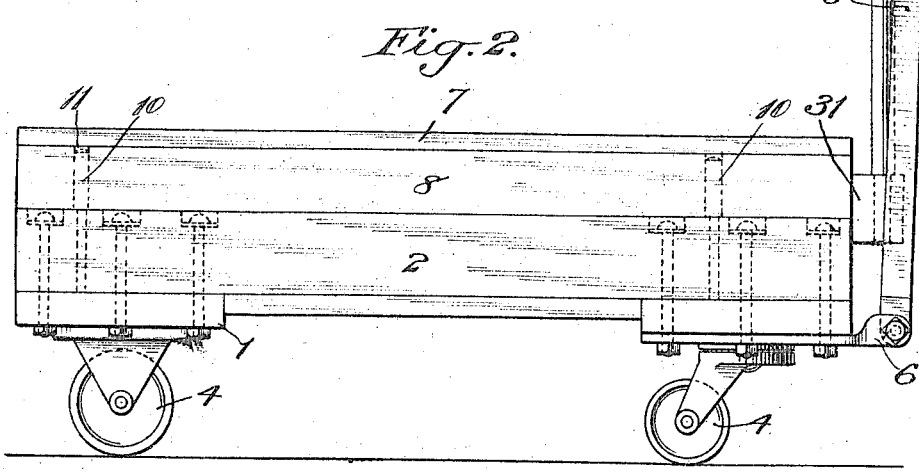

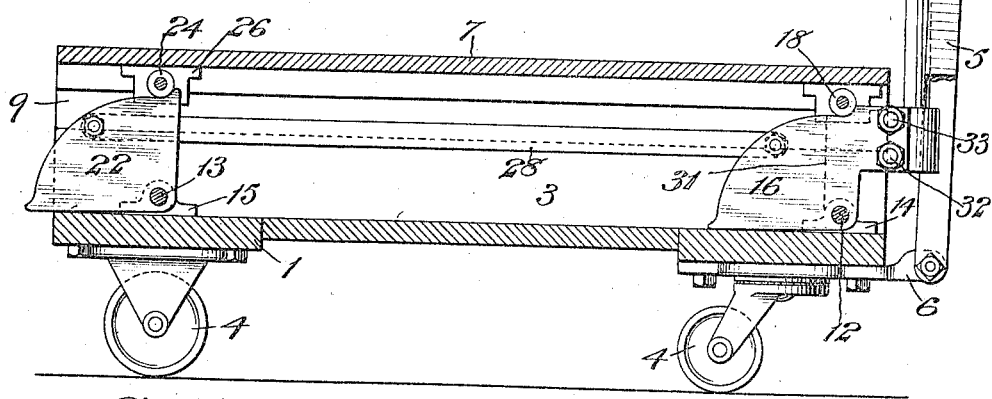
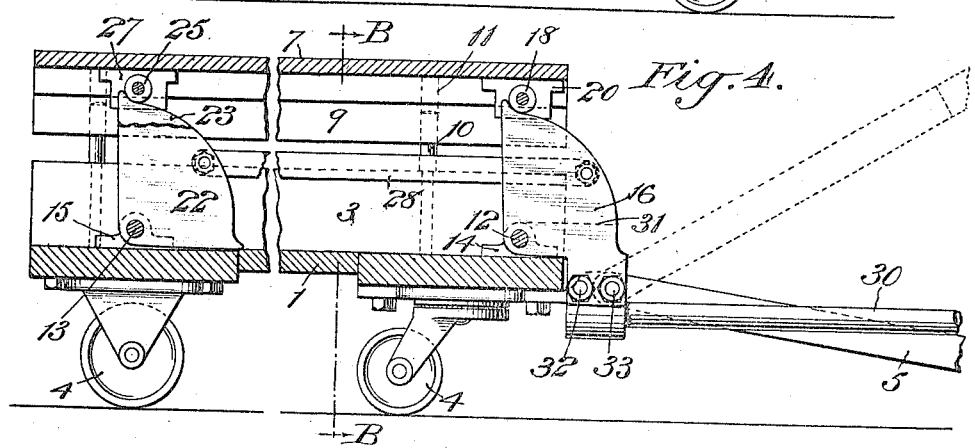
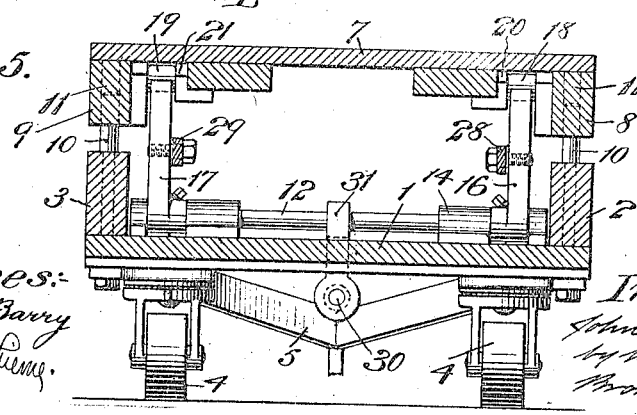

UNITED STATES PATENT OFFICE.

JOHN T. ATHERTON, OF NEW YORK, N. Y., ASSIGNOR, BY MESNE ASSIGNMENTS, TO GEORGE P. CLARK COMPANY, OF WINDSOR LOCKS, CONNECTICUT, A CORPORATION OF CONNECTICUT.

ELEVATING-TRUCK.

1,196,638.   Specification of Letters Patent.   Patented Aug. 29, 1916.

Application filed March 6, 1911.   Serial No. 612,454.

*To all whom it may concern:*

Be it known that I, JOHN T. ATHERTON, a citizen of the United States, and resident of the borough of Manhattan, in the city and State of New York, have invented a new and useful Improvement in Elevating-Trucks, of which the following is a specification.

This invention relates to improvements in elevating trucks and has for its object to provide a novel mechanism for raising and lowering the upper member of the truck, said mechanism being powerful enough to raise, sustain and permit the transportation of very heavy loads, the parts of the mechanism being so arranged that the raising of the heavy loads may be accomplished easily and rapidly.

A practical embodiment of the invention is represented in the accompanying drawings, in which, Figure 1 represents the truck in front elevation with its upper member in its lowered position. Fig. 2 is a view of the truck in side elevation. Fig. 3 is a longitudinal vertical section taken in the plane of the line A—A of Fig. 1. Fig. 4 is a similar section with parts broken away and the upper member raised to the limit of its movement away from the lower member, and Fig. 5 is a transverse vertical section taken in the plane of the line B—B of Fig. 4.

The lower member of the truck is composed of a platform 1 and uprising sides 2, 3. This platform 1 is supported by wheels 4. In the present instance four of these wheels are shown, the rear wheels being mounted in bearings fixedly secured to the platform 1 and the forward wheels being mounted in bearings swiveled to the said platform 1. A handle 5 is shown as hinged at 6 to the platform 1, for purposes of moving the truck from place to place.

The upper member of the truck comprises a platform 7 and depending sides 8, 9, which depending sides are arranged to rest upon the uprising sides 2, 3, of the lower member when the upper member is at the limit of its movement toward the lower member.

The upper member is guided in its movement toward and away from the lower member and is held against longitudinal movement with respect to the lower member, in the present instance by providing the uprising sides 2, 3, of the lower member with vertical pins 10, entering corresponding vertical holes 11 in the depending sides 8, 9, of the upper member.

A manually operated cam mechanism is interposed between the upper and lower members for raising the upper member, which cam mechanism is constructed, arranged and operated as follows: Front and rear rock shafts 12, 13, are mounted in suitable bearings 14, 15, on the platform 1 of the lower member of the truck. A plurality of cams, in the present instance two cams, 16, 17, are fixed to the front rock shaft 12 and bear against rollers 18, 19, mounted in suitable bearings 20, 21, fixed to the under side of the platform 7 of the upper member. Similarly a plurality of cams, in the present instance two cams, 22, 23, are fixed to the rock shaft 13 and bear against rollers 24, 25, mounted in suitable bearings 26, 27, fixed to the under side of the platform 7 of the upper member of the truck. The front and rear cams 16, 22, are connected to move together by a longitudinally arranged bar 28 and the front and rear cams 17, 23 are connected to move together by a longitudinally arranged bar 29. It will thus be seen that all of the cams are interconnected to move together.

The cam face of each cam which bears against the roller on the upper member of the truck, is curved, preferably with a constantly increasing distance from the axis of the cam, so that as the cams are swung from one position to another, the upper member will be gradually moved toward and away from the lower member. The roller for each cam is located at a point directly over the axis of the said cam, so that the downward thrust of the load will be directed on to the axis of each cam, thus permitting the cams to be readily and quickly moved from one position to another.

The means which I employ for manually swinging the cams comprises a hand lever 30 which is removably seated in a bracket 31. This bracket is fixed to move with the cams, in the present instance, by passing two cross tie rods 32, 33, through the two front cams 16, 17, and through the bracket 31, the front rock shaft 12 also passing through the said bracket. The angular relationship and the connection between the lever and its bracket is such that when the lever is in a vertical position, the cams will be in their lowered position, and when the lever is in its horizontal position, the cams will be in their raised position.

Where is it desired to secure an additional leverage for raising a very heavy load, the hand lever 30 may be connected to the handle 5 by a catch 34. This will give an additional leverage as the handle 5 is hinged to the lower member of the truck at a point below the connection of the hand lever with its bracket and the hinged connection of the cams with the lower member. This latch 34 is so constructed as to permit the handle and hand lever to move longitudinally one with respect to the other as they are swung from their vertical position to their horizontal position. While I have shown four interconnected cams arranged at the four corners of the truck for raising the movable member, it is to be understood that I may use a greater or lesser number of these cams as may be desired. Furthermore, the correlation between the curved surfaces of the cams and the guides for holding the movable member against longitudinal movement with respect to the lower member, will permit the upper member to be moved to any position intermediate the limits of its movements toward and away from the lower member and retain such position.

What I claim is:

1. A truck comprising the combination of a base mounted on wheels, a handle pivoted to the truck, a platform movable up and down, means to move said platform up and down, a handle operated member constituting a part of the aforesaid means pivotally connected to the base at the forward end thereof at a point back of the pivotal connection of the handle, said handle and said member being constructed and arranged to lie adjacent and substantially parallel when the handle is raised and the platform is lowered, and means arranged to operatively connect the handle operated member and detachable to extend across and in front of said handle whereby when the latter is swung downwardly said first mentioned means will be moved to elevate the platform.

2. A truck comprising the combination of a base mounted on wheels, a handle pivoted to said truck, a platform movable up and down, elevating devices one arranged at each of the four corners of the truck operable to move the platform up and down and handle operated means to operate said devices, comprising a lever having a pivotal connection with the truck at the forward end thereof, and at a point back of the connection of the handle therewith constructed and arranged to lie adjacent and parallel to the handle when the latter is raised and the platform lowered together with means connected to said lever adapted to lie across and in front of said handle whereby when the latter is lowered the platform is raised.

3. A truck comprising the combination of a base mounted on wheels, a handle pivoted to said truck for a vertical swinging movement, an elevatable platform on the base, elevating devices one arranged at each of the four corners of the truck operable to move the platform up and down, and means to operate said devices comprising a lever connected therewith having a pivoted connection at the forward end of the base at a point back of the pivotal connection of said handle, together with means connected to said lever and adapted to extend across and in front of said handle all constructed and arranged so that a compound leverage is obtained for operating said devices by lowering said handle and the handle and lever are prevented from binding by a sliding movement between said handle and the last mentioned means.

4. A truck, comprising the combination of a base mounted on wheels, an elevatable platform, a handle pivoted to the forward end of the truck, elevating devices between the base and platform and a handle operated lever connected to the elevating devices and having a pivotal connection to the forward end of the truck on a different pivot than the handle and means connected to said lever adapted to lie across and in front of said handle whereby when the latter is lowered the platform is raised.

In testimony, that I claim the foregoing as my invention, I have signed my name in presence of two witnesses, this second day of March, 1911.

JOHN T. ATHERTON.

Witnesses:
F. GEORGE BARRY,
HENRY C. THIEME.